US008553150B2

(12) United States Patent
Sawada et al.

(10) Patent No.: US 8,553,150 B2
(45) Date of Patent: Oct. 8, 2013

(54) IMAGE PROCESSING APPARATUS

(75) Inventors: Hideyuki Sawada, Neyagawa (JP);
Tadaharu Sunaga, Neyagawa (JP);
Shinya Suzuki, Neyagawa (JP)

(73) Assignee: Onkyo Corporation, Neyagawa-shi (JP)

( * ) Notice: Subject to any disclaimer, the term of this patent is extended or adjusted under 35 U.S.C. 154(b) by 931 days.

(21) Appl. No.: 12/408,045

(22) Filed: Mar. 20, 2009

(65) Prior Publication Data

US 2009/0316047 A1 Dec. 24, 2009

(30) Foreign Application Priority Data

Jun. 23, 2008 (JP) ................................. 2008-163427
Jul. 2, 2008 (JP) ................................. 2008-173928

(51) Int. Cl.
*H04N 5/14* (2006.01)
*H04N 9/64* (2006.01)
*H04N 5/445* (2011.01)

(52) U.S. Cl.
USPC ............................. 348/575; 348/571; 725/59

(58) Field of Classification Search
None
See application file for complete search history.

(56) References Cited

U.S. PATENT DOCUMENTS

| 7,474,276 | B2 | 1/2009 | Endo et al. |
| 7,583,319 | B2 | 9/2009 | Ukai et al. |
| 2006/0026318 | A1 | 2/2006 | Lee |
| 2006/0202630 | A1 | 9/2006 | Yamada |
| 2006/0259170 | A1 | 11/2006 | Sasaki et al. |
| 2007/0052733 | A1* | 3/2007 | Hirabayashi et al. ......... 345/661 |
| 2007/0070402 | A1 | 3/2007 | Kitayama et al. |

(Continued)

FOREIGN PATENT DOCUMENTS

| JP | 11-296338 | 10/1999 |
| JP | 2001-013940 | 1/2001 |

(Continued)

OTHER PUBLICATIONS

Instruction Manual Onkyo AV Receiver TX-NR905, p. 53. http://filedepot.onkyousa.com/Files/own_manuals/TX-NR905_En_A.pdf?CFID=8576018:CFTOKEN=9561560?jsessionid=f030a46a2797e7adc6f2536b3d763c391f2f.

(Continued)

*Primary Examiner* — Jefferey Harold
*Assistant Examiner* — Michael Teitelbaum
(74) *Attorney, Agent, or Firm* — Renner, Otto, Boisselle & Sklar, LLP

(57) ABSTRACT

An image processing apparatus comprising: a plurality of input terminals to which a plurality of image transmitting apparatuses that transmit image data can be connected; a plurality of output terminals to which a plurality of image receiving apparatuses that receive image data can be connected; an image processing section that adjusts image data inputted from any of the plurality of input terminals, to a processing image quality adjustment value and outputs the adjusted image data from any of the plurality of output terminals; an input setting section that sets an input image quality adjustment value for each of the plurality of input terminals, according to a user operation; an output setting section that sets an output image quality adjustment value for each of the plurality of output terminals, according to a user operation; a selecting section that selects one of the input terminals to which image data is to be inputted and one of the output terminals from which the image data is to be outputted; and an image quality adjustment value calculating section that adds together an input image quality adjustment value set for the selected input terminal and an output image quality adjustment value set for the selected output terminal and thereby calculates a processing image quality adjustment value.

7 Claims, 11 Drawing Sheets

(56) References Cited

U.S. PATENT DOCUMENTS

| | | | |
|---|---|---|---|
| 2007/0121014 A1* | 5/2007 | Lee et al. | 348/687 |
| 2007/0137988 A1 | 6/2007 | Yu et al. | |
| 2007/0220150 A1 | 9/2007 | Garg | |
| 2008/0131096 A1 | 6/2008 | Magara | |
| 2009/0013277 A1 | 1/2009 | Tachimori | |

FOREIGN PATENT DOCUMENTS

| | | |
|---|---|---|
| JP | 2002-006817 | 1/2002 |
| JP | 2002-108319 | 4/2002 |
| JP | 2003-163816 | 6/2003 |
| JP | 2004-233830 | 8/2004 |
| JP | 2005-310258 | 11/2005 |
| JP | 2006-129256 | 5/2006 |
| JP | 2006-157222 | 6/2006 |
| JP | 2006-250992 | 9/2006 |
| JP | 2006-311288 | 11/2006 |
| JP | 2007-79176 | 3/2007 |
| JP | 2007-79177 | 3/2007 |
| JP | 2007-158903 | 6/2007 |
| JP | 2009-032234 | 2/2009 |

OTHER PUBLICATIONS

"TX-SR606 Instruction manual", pp. 1-104, Retrieved from the Internet: URL:http://www.de.onkyo.com/downloads/1/4/7/0/9/Manual_TX-SR606_En_A.pdf [retrieved on Mar. 22, 2012].

Chris Boylan:"Onkyo TX-SR606 Home Theater Receiver—More HDMI Inputs, Better Upconversion", Apr. 22, 2008, Retrieved from the Internet: URL:http://www.bigpicturebigsound.com/onkyo-ts-sr606-1522.shtml [retrieved on Mar. 22, 2012].

* cited by examiner

Fig. 2

| Brightness |
|---|
| Contrast |
| Hue |
| Saturation |
| Picture Mode |
| Edge Enhancement |
| Mosquito NR |
| Random NR |
| Block NR |
| Gamma |
| R Brightness |
| Contrast |
| G Brightness |
| Contrast |
| B Brightness |
| Contrast |

Fig. 3

| Selector | Input terminal |
|---|---|
| Selector 1 | Input terminal IN2 |
| Selector 2 | Input terminal IN4 |
| Selector 3 | Input terminal IN1 |
| Selector 4 | Input terminal IN3 |

Fig. 4

Input image quality adjustment value table

| | Input brightness | Input value | Flag | Output terminal |
|---|---|---|---|---|
| Input terminal IN1 | 10 | 13 | 1 | Output terminal Out3 |
| Input terminal IN2 | 11 | 0 | 0 | Output terminal Out2 |
| Input terminal IN3 | 5 | 5 | 1 | Output terminal Out3 |
| Input terminal IN4 | 7 | 4 | 1 | Output terminal Out2 |

Output image quality adjustment value table

| | Output brightness | Input value | Flag |
|---|---|---|---|
| Output terminal OUT1 | 20 | 10 | 1 |
| Output terminal OUT2 | 5 | 0 | 0 |
| Output terminal OUT3 | 13 | 0 | 0 |
| Output terminal OUT4 | 8 | 0 | 0 |

Fig. 12

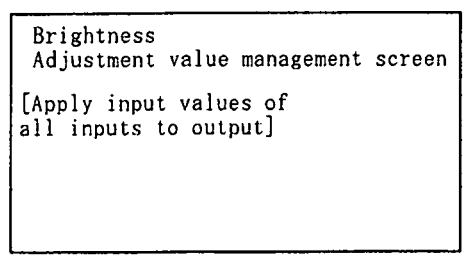

Fig. 13

|  | Input brightness | Input value | Flag | Output terminal |
|---|---|---|---|---|
| Input terminal IN4 | 7 | 4 | 1 | Output terminal Out2 |

Fig. 14

|  | Input brightness | Input value | Flag | Output terminal |
|---|---|---|---|---|
| Input terminal IN1 | 10 | 13 | 1 | Output terminal Out3 |
| Input terminal IN3 | 5 | 5 | 1 | Output terminal Out3 |

Fig. 15

|  | Input brightness | Input value | Flag | Output terminal |
|---|---|---|---|---|
| Input terminal IN4 | 7 | 0 | 1 | Output terminal Out2 |

Fig. 16

|  | Input brightness | Input value | Flag | Output terminal |
|---|---|---|---|---|
| Input terminal IN1 | 10 | 8 | 1 | Output terminal Out3 |
| nput terminal IN3 | 5 | 0 | 1 | Output terminal Out3 |

Fig. 17

|  | Output brightness | Input value | Flag |
|---|---|---|---|
| Output terminal Out1 | 20 | 10 | 1 |
| Output terminal Out2 | 9 | 0 | 0 |
| Output terminal Out3 | 18 | 0 | 0 |
| Output terminal Out4 | 8 | 0 | 0 |

Fig. 18

| Selector | Input terminal | Set value |
|---|---|---|
| Selector 3 | Input terminal IN1 | Auto |
| Selector 1 | Input terminal IN2 | Through |
| Selector 4 | Input terminal IN3 | 1080i |
| Selector 2 | Input terminal IN4 | 720p |

Fig. 19

| Output terminal | Set value |
|---|---|
| Output terminal OUT1 | Source |
| Output terminal OUT2 | 480i |
| Output terminal OUT3 | Auto |
| Output terminal OUT4 | Through |

Fig. 20

| | | Output set resolution | | | | | | | | |
|---|---|---|---|---|---|---|---|---|---|---|
| | | 480i | 480p | 720i | 720p | 1080i | 1080p | Auto | Through | Source |
| Input set resolution | 480i | 480i | 480p | 720i | 720p | 1080i | 1080p | Auto | Through | 480i |
| | 480p | | | | | | | | | 480p |
| | 720i | | | | | | | | | 720i |
| | 720p | | | | | | | | | 720p |
| | 1080i | | | | | | | | | 1080i |
| | 1080p | | | | | | | | | 1080p |
| | Auto | | | | | | | | | Auto |
| | Through | | | | | | | | | Through |

IMAGE PROCESSING APPARATUS

BACKGROUND OF THE INVENTION

1. Field of the Invention

The present invention relates to an image processing apparatus that has a plurality of input terminals and a plurality of output terminals and adjusts the image quality of image data to be inputted from an input terminal and outputs the adjusted image data from an output terminal.

2. Description of the Related Art

In an AV amplifier, a plurality of image transmitting apparatuses (e.g., DVD players) can be connected to a plurality of input terminals of the AV amplifier and a plurality of image receiving apparatuses (e.g., display apparatuses) can be connected to a plurality of output terminals of the AV amplifier. The AV amplifier enables the setting of image quality adjustment values (e.g., brightness, contrast, and saturation) and/or resolution by a user operation and adjusts image data inputted from a DVD player to the set image quality adjustment values and/or converts the image data to the set resolution and then transmits the image data to a display apparatus. Here, when a plurality of display apparatuses are connected to the plurality of output terminals and the display apparatuses have different characteristics (e.g., brightness, contrast, saturation, and resolution), each time a display apparatus that is an image data output destination is switched, the image quality adjustment values and/or resolution need to be appropriately changed by a user operation, the operation of which is very cumbersome. Furthermore, when a plurality of DVD players are connected to the plurality of input terminals and image data units outputted from the respective DVD players have different characteristics (e.g., brightness, contrast, saturation, and resolution) and user's desired image quality adjustment values and/or resolution for when image data is outputted from the AV amplifier are different for the different DVD players, each time a DVD player that accepts, as input, image data is changed, the image quality adjustment values and/or resolution need to be appropriately changed by a user operation, the operation of which is very cumbersome. Moreover, when both a DVD player and a display apparatus are switched, appropriate image quality adjustment values and/or resolution need to be determined according to the combination of a DVD player and a display apparatus and then the image quality adjustment values need to be changed.

SUMMARY OF THE INVENTION

According to a preferred embodiment of the present invention, an image processing apparatus comprising: a plurality of input terminals to which a plurality of image transmitting apparatuses that transmit image data can be connected; a plurality of output terminals to which a plurality of image receiving apparatuses that receive image data can be connected; an image processing section that adjusts image data inputted from any of the plurality of input terminals, to a processing image quality adjustment value and outputs the adjusted image data from any of the plurality of output terminals; an input setting section that sets an input image quality adjustment value for each of the plurality of input terminals, according to a user operation; an output setting section that sets an output image quality adjustment value for each of the plurality of output terminals, according to a user operation; a selecting section that selects one of the input terminals to which image data is to be inputted and one of the output terminals from which the image data is to be outputted; and an image quality adjustment value calculating section that adds together an input image quality adjustment value set for the selected input terminal and an output image quality adjustment value set for the selected output terminal and thereby calculates a processing image quality adjustment value.

When a combination of an input terminal and an output terminal is selected by a user operation, an input image quality adjustment value set for the input terminal and an output image quality adjustment value set for the output terminal are added together, whereby a processing image quality adjustment value is determined. The image processing section adjusts inputted image data to the processing image quality adjustment value and transmits the adjusted image data to an image receiving apparatus. Hence, even when the combination of an input terminal and an output terminal is changed by a user operation, an appropriate image quality adjustment value can be automatically set according to an input terminal and an output terminal to be selected.

Preferably, the image processing apparatus further comprising: an input section that inputs an input value for each of the input terminals, according to a user operation, the input value being a changed value of an input image quality adjustment value; a setting section that adds the input value to the input image quality adjustment value and sets a resulting value as a new input image quality adjustment value, when an instruction to apply the input value is inputted according to a user operation; and an output terminal setting section that associates one output terminal from which image data is to be outputted with a corresponding input terminal, upon setting the input image quality adjustment value, wherein when an instruction to apply the input value to an output terminal is inputted according to a user operation, the setting section adds the input value to an output image quality adjustment value of the output terminal that is associated with the input terminal by the output terminal setting section, and sets a resulting value as a new output image quality adjustment value.

When, although an input value for an input image quality adjustment value of an input terminal is inputted, a user realizes that an output image quality adjustment value has a problem and thus wants to change the output image quality adjustment value of an output terminal, an instruction to change the output image quality adjustment value is inputted, whereby the input value is added to the output image quality adjustment value and a new image quality adjustment value can be set.

Preferably, the image processing apparatus further comprising: an input section that inputs an input value for each of the input terminals, according to a user operation, the input value being a changed value of an input image quality adjustment value; a setting section that adds the input value to the input image quality adjustment value and sets a resulting value as a new input image quality adjustment value, when an instruction to apply the input value is inputted according to a user operation; and an output terminal setting section that associates one output terminal from which image data is to be outputted with a corresponding input terminal, upon setting the input image quality adjustment value, wherein when an instruction to apply input values of all input terminals to an output terminal is inputted according to a user operation, the setting section determines a common input value, based on input values of input terminals that are associated with a common output terminal by the output terminal setting section, adds the common input value to an output image quality adjustment value of the output terminal, and sets a resulting value as a new output image quality adjustment value.

When an overlapping input value is inputted for the plurality of input terminals, a common input value which is a value of the overlapping input value is considered to be a value that should be used to change an output image quality adjustment value of a corresponding output terminal. That is, there is a problem in the setting of the output terminal side but not in the setting of the input terminal side. Hence, a common input value is determined according to an instruction from the user and the common input value is added to an output image quality adjustment value of a corresponding output terminal, whereby a new output image quality adjustment value is set. As a result, a wasteful process in which an overlapping value for the plurality of input terminals is added to each input image quality adjustment value can be eliminated.

Preferably, the setting section determines a minimum input value among the input values of the input terminals that are associated with the common output terminal by the output terminal setting section, to be the common input value or determines an average value of the input values to be the common input value.

Preferably, an image processing apparatus comprising: a plurality of input terminals to which a plurality of image transmitting apparatuses that transmit image data can be connected; a plurality of output terminals to which a plurality of image receiving apparatuses that receive image data can be connected; an image processing section that converts image data inputted from any of the plurality of input terminals, to a processing resolution and outputs the converted image data from any of the plurality of output terminals; an input setting section that sets an input set resolution for each of the plurality of input terminals, according to a user operation; an output setting section that sets an output set resolution for each of the plurality of output terminals, according to a user operation; a selecting section that selects a combination of one of the input terminals to which image data is to be inputted and one of the output terminals from which the image data is to be outputted; and a resolution determining section that determines, for the selected combination of an input terminal and an output terminal, an input set resolution set for the input terminal to be a processing resolution, when an output set resolution of the output terminal is set to "Source"; and ignores the input set resolution set for the input terminal and determines the output set resolution set for the output terminal to be a processing resolution, when the output set resolution of the output terminal is set to other than "Source".

When an output set resolution is set to "Source", the output set resolution is ignored and an input set resolution is set as a processing resolution. For example, when an image receiving apparatus connected to an output terminal can support all resolutions, an output set resolution is set to "Source", whereby even when an input terminal with which the output terminal makes a combination is changed, by setting a user's desired resolution as an input set resolution for each image transmitting apparatus connected to a corresponding input terminal, a processing resolution can be automatically changed to an optimal resolution. When the output set resolution is set to other than "Source", the input set resolution is ignored and the output set resolution is determined to be a processing resolution. For example, when an image receiving apparatus connected to an output terminal can support only a specific resolution (or a user's desired resolution is determined by the image receiving apparatus), by setting the specific resolution as an output set resolution, image data with the specific resolution can be outputted to the image receiving apparatus, independently of an input terminal with which the output terminal makes a combination. Note that the terms "Source", "Auto", and "Through" are used to clearly describe setting items and thus even if the terms are changed to other words, as long as their main senses are the same, the other words also fall within the technical scope.

Preferably, for the selected combination of an input terminal and an output terminal, when the output set resolution is set to "Auto" or when the output set resolution is set to "Source" and the input set resolution is set to "Auto", the resolution determining section obtains from an image receiving apparatus connected to the output terminal information on resolutions supportable by the image receiving apparatus and determines a selected one of the resolutions to be a processing resolution.

For example, when the user wants to output image data at the highest one of resolutions supportable by an image receiving apparatus, by setting "Auto", information on resolutions supportable by the image receiving apparatus is obtained and a selected one of the resolutions can be determined to be a processing resolution.

Preferably, when, although the output set resolution is set to "Source" and the input set resolution is set to "Auto", information on resolutions supportable by the image receiving apparatus cannot be obtained from the image receiving apparatus connected to the output terminal, the resolution determining section controls the image processing section to output image data inputted from an image transmitting apparatus connected to the input terminal, without performing resolution conversion on the image data.

In this case, even when information on resolutions supportable by the image receiving apparatus cannot be obtained, a problem that image data cannot be outputted because a predetermined resolution cannot be determined can be prevented.

Preferably, for the selected combination of an input terminal and an output terminal, when the output set resolution is set to "Through" or when the output set resolution is set to "Source" and the input set resolution is set to "Through", the resolution determining section controls the image processing section to output image data inputted from an image transmitting apparatus connected to the input terminal, without performing resolution conversion on the image data.

In the case in which image quality degrades by the image processing section performing resolution conversion, by setting "Through", image data inputted from an image transmitting apparatus can be outputted without the image data being subjected to resolution conversion.

Preferably, when, although the output set resolution is set to "Auto", information on resolutions supportable by the image receiving apparatus cannot be obtained from the image receiving apparatus connected to the output terminal, the resolution determining section determines the input set resolution to be a processing resolution.

When the input set resolution is set to "Auto" or "Through", the resolution determining section determines a predetermined resolution to be a processing resolution.

BRIEF DESCRIPTION OF THE DRAWINGS

FIG. 2 is a diagram showing examples of an image quality adjustment value;

FIG. 3 is a diagram showing a selector table;

FIG. 4 is a diagram showing an input image quality adjustment value table;

FIG. 12 is a diagram showing a setting screen for applying the input values of all input terminals to the output image quality adjustment value;

FIG. 13 is a diagram showing data in a memory for when applying the input values of all input terminals to the output image quality adjustment value;

FIG. 14 is a diagram showing data in the memory for when applying the input values of all input terminals to the output image quality adjustment value;

FIG. 15 is a diagram showing data in the memory for when applying the input values of all input terminals to the output image quality adjustment value;

FIG. 16 is a diagram showing data in the memory for when applying the input values of all input terminals to the output image quality adjustment value;

FIG. 17 is a diagram showing an output image quality adjustment value table for when applying the input values of all input terminals to the output image quality adjustment value;

FIG. 18 is a diagram showing an input set resolution table;

FIG. 19 is a diagram showing an output set resolution table;

FIG. 20 is a diagram showing a table that describes a processing resolution to be determined according to a combination of an input set resolution and an output set resolution;

DETAILED DESCRIPTION OF THE PREFERRED EMBODIMENTS

An AV amplifier 20 which is an image processing apparatus according to preferred embodiments of the present invention will be specifically described below with reference to the drawings; however, the present invention is not limited thereto.

Figure 1:
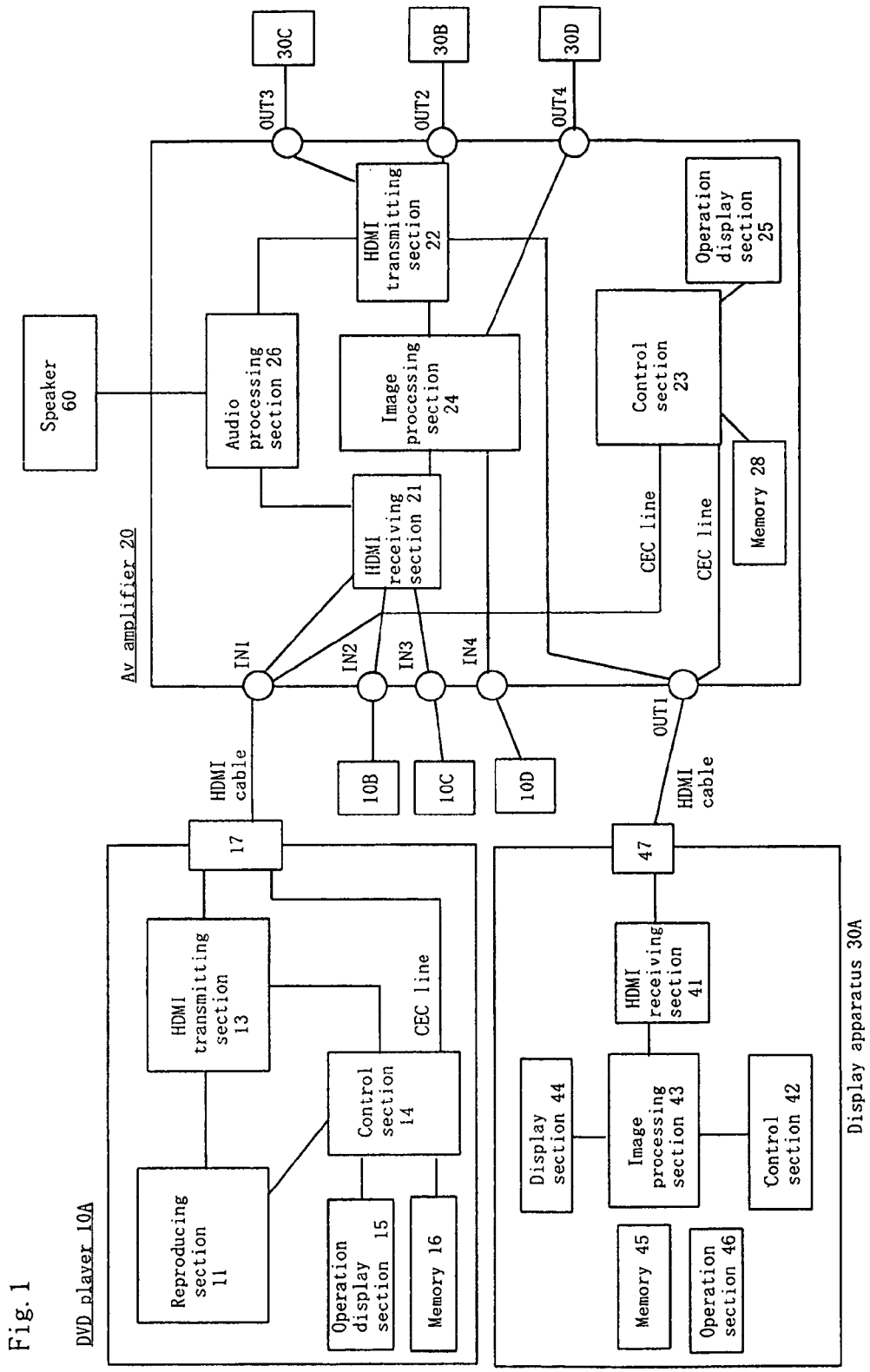
FIG. 1 is a block diagram showing an AV amplifier according to a preferred embodiment of the present invention.

FIG. 1 is a block diagram showing DVD players 10 (10A to 10D) which are image transmitting apparatuses, an AV amplifier 20, and display apparatuses 30 (30A to 30D) which are image receiving apparatuses. The AV amplifier 20 has a plurality of image input terminals (hereinafter, referred to as input terminals) IN1 to IN4 to which the DVD players 10 can be connected; and a plurality of image output terminals (hereinafter, referred to as output terminals) OUT1 to OUT4 to which the display apparatuses 30 can be connected. For example, the input terminals IN1 to IN3 are HDMI input terminals and the input terminal IN4 is an analog input terminal. For example, the output terminals OUT1 to OUT3 are HDMI output terminals and the output terminal OUT4 is an analog output terminal.

The DVD player 10A is connected to the input terminal IN1 via an HDMI cable, the DVD player 10B is connected to the input terminal IN2 via an HDMI cable, the DVD player 10C is connected to the input terminal IN3 via an HDMI cable, and the DVD player 10D is connected to the input terminal IN4 via an analog cable.

The display apparatus 30A is connected to the output terminal OUT1 via an HDMI cable, the display apparatus 30B is connected to the output terminal OUT2 via an HDMI cable, the display apparatus 30C is connected to the output terminal OUT3 via an HDMI cable, and the display apparatus 30D is connected to the output terminal OUT4 via an analog cable. Note that at least the AV amplifier 20, the DVD players 10A to 10C, and the display apparatuses 30A to 30C comply with the HDMI standard.

(Configuration of the DVD Players 10)

The DVD players 10 each have a reproducing section 11, an HDMI transmitting section 13, a control section 14, an operation display section 15, a memory 16, and an output terminal 17.

The reproducing section 11 reads image data (including the meaning of video data; the same applies hereinafter) and audio data recorded on a DVD disc (hereinafter, simply referred to as a disc) from the disc and supplies the image data and the audio data to the HDMI transmitting section 13. The reproducing section 11 includes an optical pickup, a servo circuit, an MPEG decoder, an audio decoder, etc., which are not shown.

The HDMI transmitting section 13 converts the image data and audio data supplied from the reproducing section 11 to HDMI standard data (hereinafter, referred to as HDMI data) by a command from the control section 14. The HDMI transmitting section 13 transmits the HDMI data to the AV amplifier 20 through the output terminal 17. The HDMI transmitting section 13 is connected to an HDMI receiving section 21 of the AV amplifier 20 via a TMDS line that transmits and receives HDMI data and a hot plug line for determining whether there is a connection.

The control section 14 controls the reproducing section 11, the HDMI transmitting section 13, the operation display section 15, the memory 16, etc., based on an operation program of the DVD player which is stored in the memory 16 included in or connected to the control section 14. The control section 14 is, for example, a microcomputer or CPU. The control section 14 performs various processes, based on an operation input from the operation display section 15 or a control signal and data from each section.

The control section 14 is connected to a control section 23 of the AV amplifier 20 via a CEC line and performs transmission and reception of a command and/or data with the control section 23.

(Configuration of the AV Amplifier)

The AV amplifier 20 has an HDMI receiving section 21, an HDMI transmitting section 22, a control section 23, an image processing section 24, an operation display section 25, an audio processing section 26, input terminals IN1 to IN4, output terminals OUT1 to OUT4, and a memory (a ROM, a RAM, etc.) 28.

The HDMI receiving section 21 receives HDMI data supplied to any of the input terminals IN1 to IN3 (i.e., supplied from any of the DVD players 10A to 10C), generates original image data (image data before HDMI conversion) from the received HDMI data, and supplies the image data to the image processing section 24. Also, the HDMI receiving section 21 generates original audio data from the received HDMI data and supplies the audio data to the audio processing section 26.

The image processing section 24 adjusts the image data supplied from the HDMI receiving section 21 to an image quality adjustment value (hereinafter, referred to as a processing image quality adjustment value) calculated by the control section 23 and outputs the adjusted image data to the HDMI transmitting section 22 or the output terminal OUT4. Also, the image processing section 24 receives image data supplied to the input terminal IN4 (i.e., supplied from the DVD player 10D), adjusts the image data to a processing image quality adjustment value calculated by the control section 23, and supplies the adjusted image data to the HDMI transmitting section 22 or the output terminal OUT4.

The image quality adjustment value includes, for example, as shown in FIG. 2, brightness, contrast, saturation, etc.

The HDMI transmitting section 22 converts the image data supplied from the image processing section 24 to HDMI data. The HDMI transmitting section 22 supplies the converted HDMI data to any of the output terminals OUT1 to OUT3 (i.e., any of the display apparatuses 30A to 30C).

The audio processing section 26 decodes the audio data supplied from the HDMI receiving section 21, performs processes, such as a delay process, an equalizer process, a D/A conversion process, a volume adjustment process, and an amplification process, on the decoded audio data, and supplies an audio signal to an externally connected speaker 60.

The AV amplifier 20 also includes selectors which are not shown. The selectors are such that the plurality of input terminals IN1 to IN4 are assigned in advance to selectors 1 to 4 by a user operation and by a desired selector being selected by a user operation, a desired input terminal is selected. Also, the AV amplifier 20 enables, apart from the selectors, selection of an output terminal which is an image data output destination, by a user operation. The AV amplifier 20 outputs image data inputted from an input terminal assigned to a selected selector, from a selected output terminal. The memory 28 stores a selector table shown in FIG. 3. For example, the input terminals IN1 to IN4 are assigned to the selectors 1 to 4 by a user operation. The selectors are implemented by known techniques such as a switch circuit. Information on a selected output terminal is also stored in the memory 28.

The control section 23 controls the HDMI receiving section 21, the HDMI transmitting section 22, the image processing section 24, the operation display section 25, the audio processing section 26, the memory 28, etc., based on an operation program of the AV amplifier which is stored in the memory 28 included in or connected to the control section 23. The control section 23 is, for example, a microcomputer or CPU. The control section 23 performs various processes, based on an operation input from the operation display section 25 or a control signal and data from each section. The control section 23 is connected to the control sections 14 of the respective DVD players 10A to 10C via CEC lines and performs transmission and reception of a command and data with the control sections 14. Similarly, the control section 23 is connected to control sections 42 of the respective display apparatuses 30A to 30C via CEC lines and performs transmission and reception of a command and data with the control sections 42.

A processing image quality adjustment value used by the image processing apparatus 24 to adjust image data is calculated by the control section 23, according to a combination of an input terminal assigned to a selected selector and a selected output terminal. Specifically, an input image quality adjustment value set for a selected input terminal and an output image quality adjustment value set for a selected output terminal are added together, whereby a processing image quality adjustment value used by the image processing section 24 for adjustment is calculated.

Figures 5, 6:
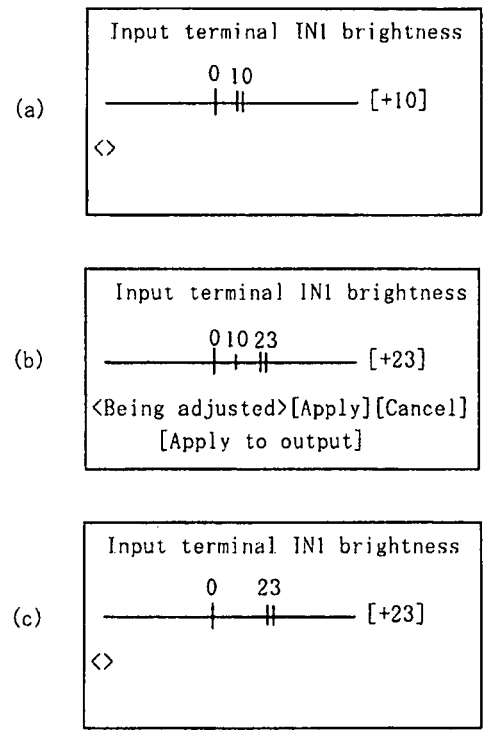
FIG. 5 is a diagram showing an output image quality adjustment value table.
FIG. 6 is a diagram showing a setting screen for an input image quality adjustment value.
Figure 7:
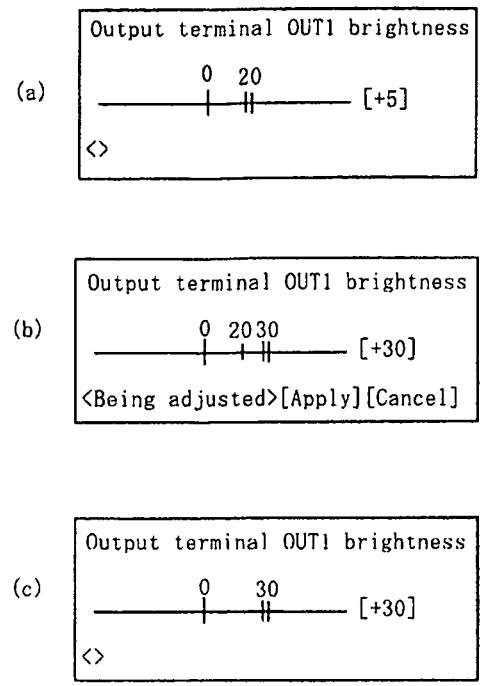
FIG. 7 is a diagram showing a setting screen for an output image quality adjustment value.

The memory 28 stores an input image quality adjustment value table shown in FIG. 4 and an output image quality adjustment value table shown in FIG. 5. The input image quality adjustment value table is a table used to set an image quality adjustment value (hereinafter, referred to as an input image quality adjustment value) for the input terminals IN1 to IN4, according to a user operation. Note that, in an actual user operation, instead of setting an input image quality adjustment value for an input terminal, an input image quality adjustment value is set for the selectors 1 to 4. The output image quality adjustment value table is a table used to set an image quality adjustment value (hereinafter, referred to as an output image quality adjustment value) for the output terminals OUT1 to OUT4, according to a user operation. An input image quality adjustment value setting screen shown in FIG. 6 and an output image quality adjustment value setting screen shown in FIG. 7 are displayed on the operation display section 25 (or OSD outputted to a display apparatus 30) and each image quality adjustment value is inputted and set by a user operation.

(Configuration of the Display Apparatuses 30)

The display apparatuses 30 each have an HDMI receiving section 41, a control section 42, an image processing section 43, a display section 44, a memory (a ROM, a RAM, etc.) 45, an operation section 46, and an input terminal 47.

The HDMI receiving section 41 receives HDMI data transmitted from the HDMI transmitting section 22 of the AV amplifier 20, generates original image data from the received HDMI data, and supplies the image data to the image processing section 43. The image processing section 43 performs image processing on the supplied image data if necessary and supplies the image data to the display section 44.

To the display section 44 is supplied the image data from the image processing section 43 and the display section 44 displays an image, based on the image data. The display section 44 is, for example, an LCD or CRT.

The control section 42 controls the HDMI receiving section 41, the image processing section 43, the display section 44, the memory 45, etc. The control section 42 is, for example, a microcomputer. The control section 42 performs various processes, based on an operation input from the operation section 46 or a control signal and data from each section.

The memory 45 stores in advance EDID that contains resolution types supportable by the display apparatus 30 (displayable by the display section 44). The EDID is read by the control section 23 of the AV amplifier 20 through a DDC line.

The operation in the present invention will be described below. Here, description is made of the case in which the image quality adjustment value is "brightness" and the input image quality adjustment value is referred to as an input brightness, the output image quality adjustment value is referred to as an output brightness, and the processing image quality adjustment value is referred to as a processing brightness. Note that the same also applies to other image quality adjustment values.

(Processing Brightness Calculation Process)

Figure 8:
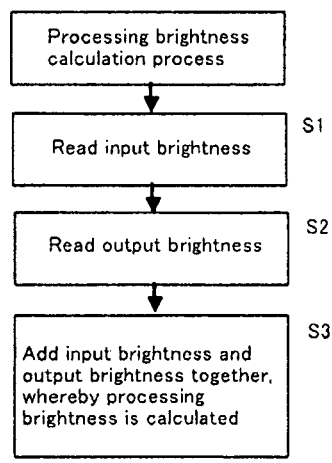
FIG. 8 is a flowchart showing a process of calculating a processing image quality adjustment value.

FIG. 8 is a flowchart showing a process performed by the control section 23 in which a processing brightness used by the image processing section 24 to adjust image data is calculated. The control section 23 determines an input terminal to which a selected selector is assigned and reads an input brightness associated with the input terminal from the input image quality adjustment value table in FIG. 4 (S1). Subsequently, the control section 23 determines a selected output terminal and reads an output brightness associated with the output terminal from the output image quality adjustment value table in FIG. 5 (S2). The control section 23 adds the read input brightness and output brightness together and thereby calculates a processing brightness, and instructs the image processing section 24 to adjust image data to the processing brightness (S3). For example, when a combination of the input terminal IN1 and the output terminal OUT1 is selected, since the input brightness is "10" and the output brightness is "20", the processing brightness is calculated to be "30".

(Input Brightness Setting Process)

Figure 9:
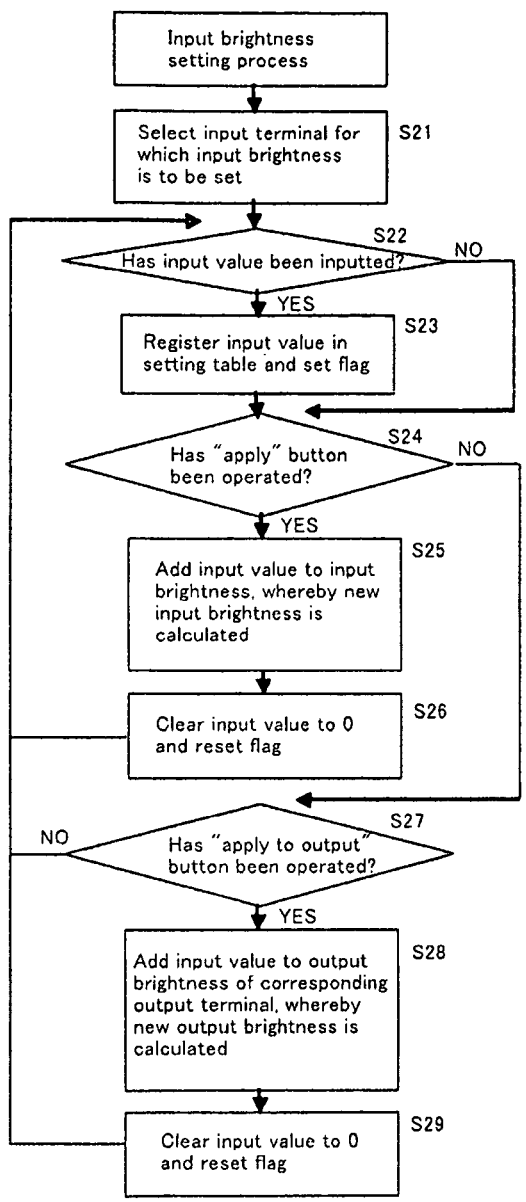
FIG. 9 is a flowchart showing an input image quality adjustment value setting process.

FIG. 9 is a flowchart showing an input brightness setting process performed by the control section 23. The control section 23 selects an input terminal for which an input brightness is to be set, according to a user operation. For example, when the input terminal IN1 is selected, a setting screen shown in (a) of FIG. 6 is displayed. Initially, as shown in FIG. 4, the input brightness of the input terminal IN1 is "10" and before an input value is inputted, the current input brightness "10" is shown by a double line cursor, as shown in (a) of FIG. 6.

Now, the input image quality adjustment value table in FIG. 4 will be described in detail. In the input image quality adjustment value table, an input brightness, an input value, a flag, and an output terminal are registered for each of the input terminals IN1 to IN4 in an association manner. An input brightness is an input brightness set for its corresponding input terminal. An input value is a changed value for the input brightness which is inputted by a user operation, and is a value that is not yet reflected in a change in the input brightness. In a state in which the input value is inputted, a corresponding flag is set to 1 and in a state in which the input value is not inputted, the corresponding flag is reset to 0. In the input terminal IN1 in FIG. 4, the input brightness is 10 and the input value is 13.

An output terminal in the input image quality adjustment value table in FIG. 4 represents an output terminal to which is connected a display apparatus 30 that is an output destination of image data for checking an input brightness obtained after adding an input value to an input brightness, when the input brightness is set (i.e., when the input value is inputted using the setting screen shown in FIG. 6 by a user operation). Specifically, for the input terminal IN1, image data is outputted from the output terminal OUT3, an image is displayed on a display apparatus 30 connected to the output terminal OUT3, and a user adjusts an input value for an input brightness as watching the image. Note that, in practice, image data that is adjusted to a processing brightness obtained by further adding an output brightness set for the output terminal OUT3 to a changed input brightness obtained by adding an input value to an input brightness, is outputted from the output terminal OUT3 (note, however, that the configuration is not limited thereto and image data that is adjusted to a changed input brightness obtained by adding an input value to an input brightness may be outputted).

As shown in FIG. 9, the control section 23 determines whether an input value has been inputted by a user operation (S22). When an input value is inputted by the user operating the double line cursor being in the state shown in (a) of FIG. 6 in the right direction (increasing direction) (e.g., the input value "13" is inputted) (YES at S22), as shown in (b) of FIG. 6, the input brightness "10" is shown by a single line and the value "23" obtained after adding the input value to the input brightness is shown by a double line cursor. The control section 23 registers the inputted input value "13" in the input value of the input terminal IN1 in FIG. 4 and sets a corresponding flag to 1 (S23). At this time, the image processing section 24 adjusts image data to the value "36" obtained by adding the output brightness "13" of the output terminal OUT3 to the value "23" obtained by adding the input value to the input brightness, and outputs the image data from the output terminal OUT3. Note that until an "apply" button or an "apply to output" button which will be described below is operated (NO at S24 and NO at S27), the input value can be appropriately changed by a user operation.

The control section 23 determines whether the "apply" button has been operated (S24). If the "apply" button has not been operated (NO at S24), then processing proceeds to S27. If the "apply" button has been operated (YES at S24), then the control section 23 sets the value "23" obtained by adding the input value "13" to the input brightness "10", as a new input brightness (S25). Accordingly, the control section 23 changes the input brightness for the input terminal IN1 to "23" in FIG. 4, changes the input value to "0", and resets the flag to 0 (S25 and S26). At this time, as shown in (c) of FIG. 6, the new input brightness is displayed by a double line cursor. Thereafter, processing returns to S22 and it is determined again whether an input value has been newly inputted.

Accordingly, when the input terminal IN1 and the output terminal OUT3 are selected by a user operation, the input brightness "23", and the output brightness "13" are added together, resulting in the processing brightness being 36.

At S27, the control section 23 determines whether the "apply to output" button has been operated (S27). If the "apply to output" button has not been operated (NO at S27), then processing returns to S22. On the other hand, if the "apply to output" button has been operated (YES at S27), then the control section 23 adds the input value to the output brightness of the output terminal OUT3 associated with the input terminal IN1 in FIG. 4 (i.e., an image data output destination at the time of setting the input brightness), instead of adding the input value to the input brightness of the input terminal IN1 (S28). Specifically, as shown in FIG. 5, the input value "13" is added to the output brightness "13" of the output terminal OUT3, whereby a new output brightness "26" is calculated (the "output brightness" section of the output terminal OUT3 in FIG. 5 is changed to "26"). Thereafter, the flag for the input terminal IN1 in FIG. 4 is reset to 0 (S29).

The reason for thus inputting an input value for an input brightness and reflecting the input value in an output brightness is as follows. When a processing brightness does not match a user's preference, there may be a case in which as a result of inputting an input value for an input brightness, although the input brightness is appropriate, an output brightness is inappropriate. In this case, if the input brightness of the input terminal IN1 is changed and the output brightness of the output terminal OUT3 is not changed, when, for example, another combination of the input terminal IN2 and the output terminal OUT3 is selected, too, the processing brightness results in a value that does not match the user's preference. Hence, when the user realized such a fact, by applying the input value for the input brightness to the output brightness, when another combination of the input terminal IN2 and the output terminal OUT3 is selected, too, image data can be outputted at a processing brightness that matches the user's preference.

(Output Brightness Setting Process)

Figure 10:
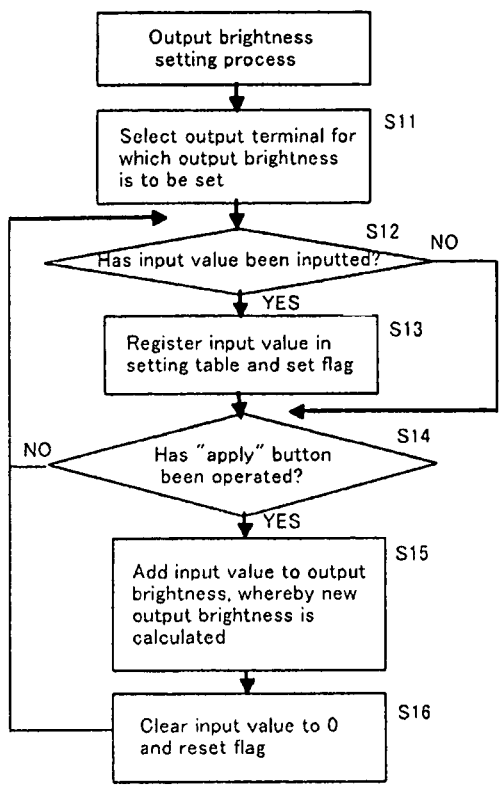
FIG. 10 is a flowchart showing an output image quality adjustment value setting process.

FIG. 10 is a flowchart showing an output brightness setting process performed by the control section 23. The control section 23 selects an output terminal for which an output brightness is to be set, according to a user operation (S11). For example, when the output terminal OUT1 is selected, a setting screen shown in (a) of FIG. 7 is displayed. Initially, as shown in FIG. 5, the output brightness of the output terminal OUT1 is "20" and before an input value is inputted, the current output brightness "20" is shown by a double line cursor, as shown in (a) of FIG. 7.

Now, the output image quality adjustment value table in FIG. 5 will be described in detail. In the output image quality adjustment value table, an output brightness, an input value, and a flag are registered for each of the output terminals OUT1 to OUT4 in an association manner. An output brightness is an output brightness set for its corresponding output terminal. An input value is a changed value for the output brightness which is inputted by a user operation, and is a value that is not yet reflected in a change in the output brightness. In a state in which the input value is inputted, a corresponding flag is set to 1 and in a state in which the input value is not inputted, the corresponding flag is reset to 0. For the output terminal OUT1 in FIG. 5, the output brightness is 20 and the input value is 10. Note that image data that is adjusted to a changed output brightness obtained by adding an input value to an output brightness is outputted from an output terminal.

As shown in FIG. 10, the control section 23 determines whether an input value has been inputted by a user operation (S12). When an input value is inputted by the user operating the double line cursor being in the state shown in (a) of FIG. 7 in the right direction (increasing direction) (e.g., the input value "10" is inputted) (YES at S12), as shown in (b) of FIG. 7, the input brightness "20" is shown by a single line and the value "30" obtained after adding the input value to the output brightness is shown by a double line cursor. The control section 23 registers the inputted input value "10" in the input value of the output terminal OUT1 in FIG. 5 and sets a corresponding flag to 1 (S13). At this time, the image processing section 24 adjusts image data to the value "30" obtained by adding the input value to the output brightness, and outputs the image data from the output terminal OUT1. Note that until an "apply" button which will be described below is operated (NO at S14), the input value can be appropriately changed by a user operation.

The control section 23 determines whether the "apply" button has been operated (S14). If the "apply" button has not been operated (NO at S14), then processing proceeds to S12. If the "apply" button has been operated (YES at S14), then the control section 23 determines the value "30" obtained by adding the input value "10" to the output brightness "20" to be a new output brightness (S15). Accordingly, the control section 23 changes the output brightness for the output terminal OUT1 to "30" in FIG. 5, changes the input value to "0", and resets the flag to 0 (S15 and S16). At this time, as shown in (c) of FIG. 7, the new output brightness is displayed by a double line. Thereafter, processing returns to S12 and it is determined again whether an input value has been newly inputted.

Accordingly, when the output terminal OUT1 and the input terminal IN1 are selected by a user operation, the input brightness "10" and the output brightness "30" are added together, resulting in the processing brightness being 40.

(Process of Applying Input Values for all Input Terminals to a Corresponding Output Terminal)

In the present example, in a state in which input values are respectively inputted for a plurality of input terminals associated with one same output terminal in FIG. 4 and the "apply" button is not operated, it is better to apply a common value (common input value) among the input values to an output brightness of the output terminal than to apply the input values to input brightnesses of the corresponding input terminals. This is because it is considered that for the common input value among the input values the output brightness of the output terminal has a problem.

Figure 11:
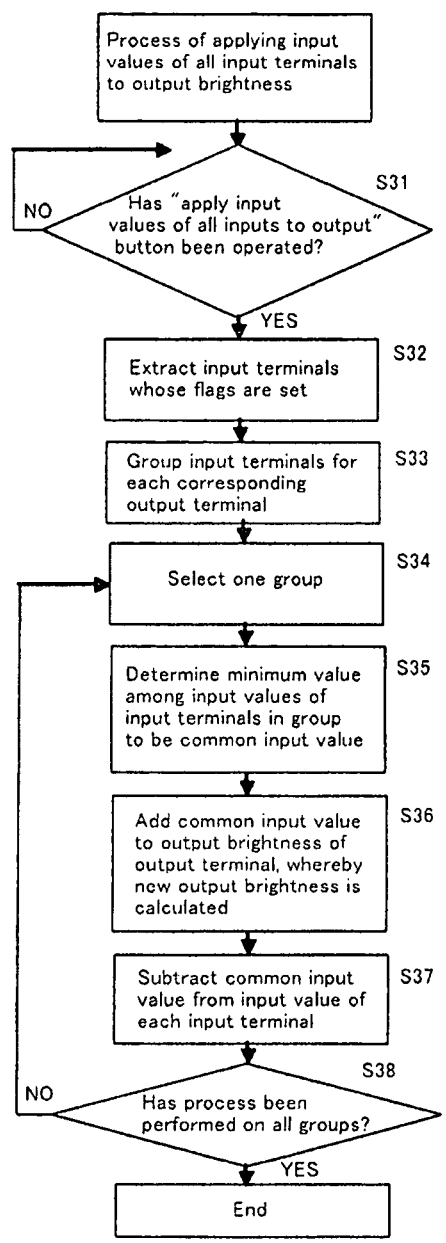
FIG. 11 is a flowchart showing a process of applying input values of all input terminals to an output image quality adjustment value.

FIG. 11 is a flowchart showing the operation in the present example. The control section 23 determines whether an "apply input values of all inputs to output" button has been operated on a setting screen in FIG. 12 (S31). If the "apply input values of all inputs to output" button has been operated (YES at S31), then the control section 23 extracts only those input terminals whose flags are set to 1 (i.e., whose input values are inputted) in the input image quality adjustment value table in FIG. 4 (S32) In FIG. 4, the input terminals IN1, IN3, and IN4 are extracted.

Subsequently, the control section 23 groups the extracted input terminals for each associated output terminal (S33). In FIG. 4, the extracted input terminals are divided into a group of the input terminal IN4 with which the output terminal OUT2 is associated (FIG. 13) and a group of the input terminals IN1 and IN3 with which the output terminal OUT3 is associated (FIG. 14).

Then, the control section 23 selects one of the groups (S34). Here, the group of the input terminal IN4 with which the output terminal OUT2 is associated is selected. Then, a minimum input value (note that the minimum input value is limited to a positive value, for example) among the input values of input terminals included in the selected group is determined to be a common input value (S35). In this case, since only the input terminal IN4 is included in the group, the input value "4" is determined to be a common input value.

Subsequently, the control section 23 adds the common input value "4" to the output brightness of the output terminal OUT2 and thereby calculates a new output brightness (S36). In this case, the output brightness of the output terminal OUT2 in the output image quality adjustment value table in FIG. 5 is changed from "5" to "9", as shown in FIG. 17. Then, the control section 23 subtracts the common input value from the input values of input terminals in the group (S37). In this case, as shown in FIG. 15, the input value of the input terminal IN4 is changed from "4" to "0". Note that when the input value becomes "0" the flag may be reset to 0.

Then, the control section 23 determines whether the above-described process has been performed on all output terminal groups (S38). If the process has not been completed on all groups (NO at S38), then processing returns to S34. In this case, processing returns to S34 to perform the process on the group for the output terminal OUT3.

The control section 23 selects the group of the input terminals IN1 and IN3 with which the output terminal OUT3 is associated (S34). Then, the minimum input value "5" among the input values of the input terminals included in the selected group is determined to be a common input value (S35). Subsequently, the control section 23 adds the common input value "5" to the output brightness of the output terminal OUT3 and thereby calculates anew output brightness (S36). In this case, the output brightness of the output terminal OUT3 in the output image quality adjustment value table in FIG. 5 is changed from "13" to "18", as shown in FIG. 17. Then, the control section 23 subtracts the common input value from the input values of input terminals in the group (S37). In this case, as shown in FIG. 16, the input value of the input terminal IN1 is changed from "13" to "8" and the input value of the input terminal IN3 is changed from "5" to "0". Thereafter, the determination at S38 is YES and then the process ends.

As described above, by adding a common input value among input values of input terminals to an output brightness of a corresponding output terminal, input brightnesses of a plurality of input terminals can be prevented from being changed to an overlapping value.

Note that a common input value calculation method is not limited to a method in which a minimum input value in a group is used as a common input value, and an average value of all input values of input terminals in a group can be used as a common input value. In this case, for the group of the input terminal IN4 the common input value is "4", and for the group of the input terminals IN1 and IN3 the common input value is "9". As a result, in FIG. 5 the output brightness of the output terminal OUT3 is changed from "13" to "22", and in FIG. 14 the input value of the input terminal IN1 is changed from "13" to "4" and the input value of the input terminal IN3 is changed from "5" to "–4". Alternatively, a minimum input value or average value of the sum of input values and input brightnesses may be used as a common input value.

Next, another preferred embodiment of the present invention will be described. The configurations of DVD players 10, an AV amplifier 20, and display apparatuses 30 are as described in FIG. 1, except for the following differences in the configuration of the AV amplifier 20.

An image processing section 24 converts a resolution of image data supplied from an HDMI receiving section 21 to a processing resolution determined by a control section 23, in response to an instruction from the control section 23 and outputs the image data to an HDMI transmitting section 22 or an output terminal OUT4. Also, the image processing section 24 receives image data supplied to an input terminal IN4 (i.e., supplied from a DVD player 10D), converts a resolution of the image data to a determined processing resolution, in response to an instruction from the control section 23, and supplies the image data to the HDMI transmitting section 22 or the output terminal OUT4.

A processing resolution used by the image processing section 24 to convert image data is determined by the control section 23, according to a combination of an input terminal assigned to a selected selector and a selected output terminal. A memory 28 stores an input set resolution table shown in FIG. 18 and an output set resolution table shown in FIG. 19. The input set resolution table is a table used to set a resolution for input terminals IN1 to IN4 (hereinafter, referred to as an input set resolution), according to a user operation. Note that, in an actual user operation, instead of setting a resolution for an input terminal, a resolution is set for selectors 1 to 4. The output set resolution table is a table used to set a resolution for output terminals OUT1 to OUT4 (hereinafter, referred to as an output set resolution), according to a user operation. An input set resolution screen and an output set resolution screen are displayed on an operation display section 25 (or OSD outputted to a display apparatus 30) and each resolution is inputted and set by a user operation.

FIG. 20 is a diagram showing a table that describes a processing resolution used by the image processing section 24 to convert and output image data, based on an input set resolution and an output set resolution. As shown in a vertical axis in FIG. 20, the input set resolution can be set, for example, to 480i, 480p, 720i, 720p, 1080i, 1080p, Auto, or Through. As shown in a horizontal axis in FIG. 20, the output set resolution can be set, for example, to 480i, 480p, 720i, 720p, 1080i, 1080p, Auto, Through, or Source.

As shown in FIG. 20, when the output set resolution is set to other than "Source", i.e., 480i, 480p, 720i, 720p, 1080i, 1080p, Auto, or Through, the input set resolution is ignored and the processing resolution used by the image processing section 24 for conversion is determined to be the output set resolution. When a display apparatus 30 connected to an output terminal supports only a specific resolution (the word "support" refers to displayable; the same applies hereinafter) a resolution at which image data is outputted to the display apparatus 30 should be converted to the resolution supportable by the display apparatus 30, independent of the resolution of image data outputted from a DVD player 10.

Hence, by the resolution supportable by the display apparatus 30 being set as an output set resolution, the input set resolution is ignored and the processing resolution used by the image processing section 24 for conversion is determined to be the output set resolution. Thus, image data inputted from the DVD player 10 is converted to the output set resolution and the converted image data is outputted to the display apparatus 30. Accordingly, image data with the resolution supportable by the display apparatus 30 is always outputted to the display apparatus 30.

On the other hand, when the output set resolution is set to "Source", the output set resolution is ignored and a resolution at which image data is outputted from the image processing section 24 is determined to be the input set resolution. When a display apparatus 30 connected to an output terminal supports all (most) resolutions of 480i, 480p, 720i, 720p, 1080i, and 1080p and thus can support image data of any resolution supplied, the output set resolution is set to "Source".

For an input set resolution, a user's desirable resolution is set which is used by the image processing section 24 to convert image data outputted from a DVD player 10 connected to an input terminal. For example, when, as in the input terminal IN4 in FIG. 18, the user desires image data with a resolution of 480i output from a DVD player to perform conversion to 720p, the input set resolution is set to 720p, whereby the image processing section 24 converts image data from 480i to 720p. Note that, as will be described later, when the input set resolution is set to "Auto", the processing resolution used by the image processing section 24 for conversion is automatically determined to be a resolution (e.g., 1080p) supportable by a display apparatus 30. Hence, when the user wants the image processing section 24 to perform conversion to 720p but not to 1080p (e.g., when upconversion to 1080p causes image quality degradation), the input set resolution should be set to 720p.

Similarly, when, as in the input terminal IN3 in FIG. 18, the user desires image data with a resolution of 720i output from a DVD player to perform conversion to 1080i, the input set resolution is set to 1080i, whereby the image processing section 24 converts image data from 720i to 1080i. Note that, as will be described later, when the input set resolution is set to "Auto", the processing resolution used by the image processing section 24 for conversion is set to a resolution (e.g., 1080p) supportable by a display apparatus. Hence, when the user wants the image processing section 24 to perform conversion to 1080i but not to 1080p (e.g., when the user wants to avoid image quality degradation caused by conversion from interlace to progressive), the input set resolution should be set to 1080i.

By this, image data inputted from the DVD player 10 is converted by the image processing section 24 to the input set resolution and the converted image data is outputted to the display apparatus 30. Since the display apparatus 30 can support all resolutions, the display apparatus 30 can reproduce the supplied image data.

For an output terminal whose output set resolution is set to "Source", by changing an input terminal (DVD player 10) assigned to the output terminal, the processing resolution used by the image processing section 24 for conversion can be automatically changed to an appropriate resolution. Specifically, when an input terminal assigned to an output terminal whose output set resolution is set to "Source" is changed from one to which image data with a resolution of 480i is inputted and which wants the image processing section 24 to perform conversion from 480i to 720p, to another to which image data with a resolution of 720i is inputted and which wants the image processing section 24 to perform conversion from 720i to 1080i, since the processing resolution used by the image processing section 24 for conversion is determined to be an input set resolution, the processing resolution is automatically changed from 720p to 1080i and thus the resolution setting does not need to be changed by a user operation each time the input terminal is changed.

When the output set resolution is set to "Auto" or when the output set resolution is set to "Source" and the input set resolution is set to "Auto", the control section 23 reads, through a DDC line, from a memory 45 of a display apparatus 30 EDID that contains resolution types supportable by the display apparatus 30. The control section 23 selects one of the resolutions contained in the EDID and determines the selected resolution to be a processing resolution used by the image processing section 24 for conversion. For example, of the resolutions contained in the EDID, a resolution (when there are a plurality of resolutions, the highest resolution) that matches a resolution supportable (resolution convertible and/or transmittable and receivable; the same applies hereinafter) by the AV amplifier 20 is determined to be a processing resolution used by the image processing section 24 for conversion.

That is, such setting is performed when the user wants a conversion process to the highest resolution supportable by the display apparatus 30 to be performed. When, depending on the type of DVD player 10, there is an apparatus for which the user wants a conversion process to the highest resolution supportable by the display apparatus 30 to be performed and there is an apparatus for which the user does not want such a conversion process to be performed, only an input set resolution of an input terminal connected to the apparatus for which the user wants a conversion process to the highest resolution supportable by the display apparatus 30 to be performed should be set to "Auto". On the other hand, when, depending on the type of display apparatus 30, there is an apparatus for which the user wants a conversion process to the highest resolution supportable by the display apparatus 30 to be performed and there is an apparatus for which the user does not want such a conversion process to be performed, only an output set resolution of an output terminal connected to the apparatus for which the user wants a conversion process to the highest resolution supportable by the display apparatus 30 to be performed should be set to "Auto".

When the output set resolution is set to "Through" or when the output set resolution is set to "Source" and the input set resolution is set to "Through", the image processing section 24 outputs image data supplied from a DVD player 10 as it is without performing resolution conversion on the image data.

That is, such setting is performed when the user does not want the image processing section 24 to perform a conversion process because resolution conversion causes image quality degradation. When, depending on the type of DVD player 10, there is an apparatus for which resolution conversion by the image processing section 24 causes image quality degradation and there is an apparatus for which such image quality degradation is not caused, only an input set resolution of an input terminal connected to the apparatus that does not want resolution conversion to be performed should be set to "Through". On the other hand, when, depending on the type of display 30, there is an apparatus for which resolution conversion by the image processing section 24 causes image quality degradation and there is an apparatus for which such image quality degradation is not caused, only an output set resolution of an output terminal connected to the apparatus that does not want resolution conversion to be performed should be set to "Through".

Figure 21:
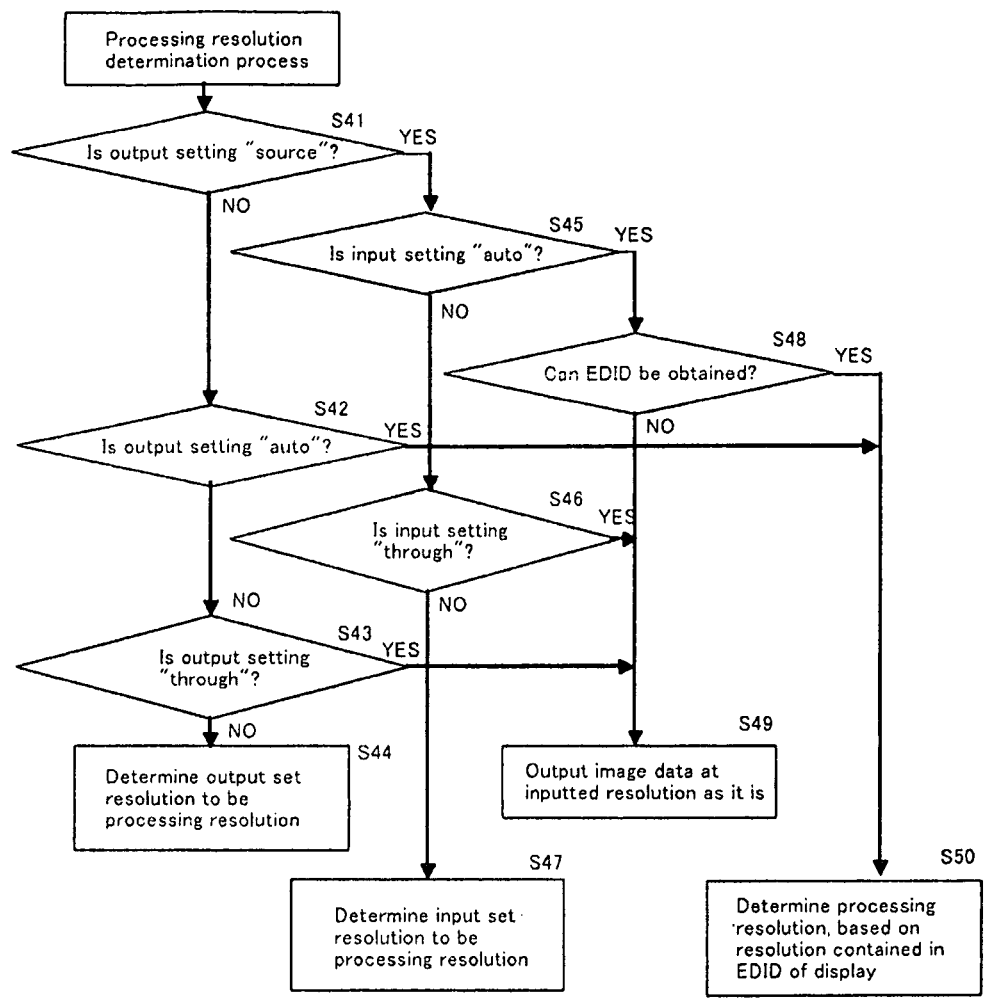
FIG. 21 is a flowchart showing a processing resolution determination process performed by a control section.

A processing resolution determination process performed by the AV amplifier 20 according to the present embodiment will be described below with reference to a flowchart in FIG. 21 (and FIGS. 18 to 20). The control section 23 determines, for a combination of an input terminal assigned to a selected selector and an output terminal, whether an output set resolution is set to "Source" (S41). If the output set resolution is set to "Source" (YES at S41), then processing proceeds to S5 (described later). On the other hand, if the output set resolution is not set to "Source" (NO at S41), then the control section 23 determines whether the output set resolution is set to "Auto" (S42).

If the output set resolution is set to "Auto" (YES at S42), then the control section 23 obtains EDID of a display apparatus 30, reads resolutions supportable by the display apparatus 30 from the EDID, and determines one of the resolutions that is supportable by the AV amplifier 20 to be a processing resolution at which image data is outputted from the image processing section 24.

If the output set resolution is not set to "Auto" (NO at S42), then the control section 23 determines whether the output set resolution is set to "Through" (S43). If the output set resolution is set to "Through" (YES at S43), then the control section 23 controls the image processing section 24 to output image data outputted from a DVD player 10 without performing resolution conversion on the image data (S49). On the other hand, if the output set resolution is not set to "Through" (NO at S43), then the control section 23 sets the output set resolution as a processing resolution used by the image processing section 24 for conversion (S44).

If at S41 the output set resolution is set to "Source" (YES at S41), then the control section 23 determines whether an input set resolution is set to "Auto" (S45). If the input set resolution is set to "Auto" (YES at S45), then the control section 23 determines whether the control section 23 is connected to a display apparatus 30 via an HDMI DDC line and can obtain EDID containing resolution information from the display apparatus 30 (S48). Specifically, by determining whether the output terminal is an HDMI output terminal or whether EDID obtained from the display apparatus 30 contains information on resolutions, it is determined whether resolution information can be obtained. If EDID containing resolution information can be obtained (YES at S48), then the control section 23 obtains EDID of the display apparatus 30, reads resolutions supportable by the display apparatus 30 from the EDID, and determines one of the resolutions that is supportable by the AV amplifier 20 to be a processing resolution used by the image processing section 24 for conversion (S50).

On the other hand, if EDID containing resolution information cannot be obtained (NO at S48), then the control section 23 controls the image processing section 24 to output image data outputted from a DVD player 10 without performing resolution conversion on the image data (S49).

If at S45 the input set resolution is not set to "Auto" (NO at S45), then the control section 23 determines whether the input set resolution is set to "Through" (S46). If the input set resolution is set to "Through" (YES at S46), then the control section 23 controls the image processing section 24 to output image data outputted from a DVD player 10 without performing resolution conversion on the image data (S49). On the other hand, if the input set resolution is not set to "Through" (NO at S46), then the control section 23 sets the input set resolution as a processing resolution used by the image processing section 24 for conversion (S47).

Next, a processing resolution will be described that is used by the image processing section 24 for conversion and is determined when the output set resolution and the input set resolution are set as shown in FIGS. 18 and 19.

((1) For a Combination of the Output Terminal OUT1 and the Input Terminal IN1)

Since, as shown in FIG. 19, the output set resolution of the output terminal OUT1 is set to "Source", the processing resolution used by the image processing section 24 for conversion is determined according to an input set resolution set for an input terminal with which the output terminal OUT1 makes a combination. As shown in FIG. 18, the input set resolution of the input terminal IN1 is set to "Auto". Thus, in FIG. 21, the determination at S41 is YES, the determination at S45 is YES, and the determination at S48 is YES. Accordingly, the control section 23 obtains EDID of a display apparatus 30, reads resolutions supportable by the display apparatus 30 from the EDID, and sets one of the resolutions that is supportable by the AV amplifier 20 as a processing resolution used by the image processing section 24 for conversion. For example, when the display apparatus 30 can support 480i, 480p, 720i, 720p, 1080i, and 1080p and the AV amplifier 20 can support 480i, 480p, 720i, 720p, 1080i, and 1080p, the processing resolution used by the image processing section 24 for conversion is determined to be 1080p. Thus, when image data with a resolution of 480i is inputted from a DVD player 10, the image processing section 24 converts the image data from 480i to 1080p and outputs the converted image data to the display apparatus 30.

((2) For a Combination of the Output Terminal OUT1 and the Input Terminal IN2)

As shown in FIG. 19, the output set resolution of the output terminal OUT1 is set to "Source" and as shown in FIG. 18, the input set resolution of the input terminal IN2 is set to "Through". Thus, in FIG. 21, the determination at S41 is YES, the determination at S45 is NO, and the determination at S46 is YES. Accordingly, the control section 23 controls the image processing section 24 to output image data outputted from a DVD player 10 without performing resolution conversion on the image data. For example, when the DVD player 10 outputs image data with a resolution of 720p, the image processing section 24 outputs the image data at a resolution of 720p as it is to a display apparatus 30.

((3) For a Combination of the Output Terminal OUT1 and the Input Terminal IN3)

As shown in FIG. 19, the output set resolution of the output terminal OUT1 is set to "Source" and as shown in FIG. 18, the input set resolution of the input terminal IN3 is set to 1080i. Thus, in FIG. 21, the determination at S41 is YES, the determination at S45 is NO, and the determination at S46 is NO. Accordingly, the control section 23 sets the input set resolution "1080i" as a processing resolution used by the image processing section 24 for conversion. Hence, when image data with a resolution of 720i is inputted from a DVD player 10, the image processing section 24 converts the image data from 720i to 1080i and outputs the converted image data to a display apparatus 30. Note that when, as in (1), the input set resolution is set to "Auto", the processing resolution used by the image processing section 24 for conversion is determined to be 1080p and thus conversion to progressive is also involved; on the other hand, in the case of (3), image data can be outputted at a resolution of 1080i without conversion to progressive being performed.

((4) For a Combination of the Output Terminal OUT1 and the Input Terminal IN4)

As shown in FIG. 19, the output set resolution of the output terminal OUT1 is set to "Source" and as shown in FIG. 18, the input set resolution of the input terminal IN4 is set to 720p. Thus, in FIG. 21, the determination at S41 is YES, the determination at S45 is NO, and the determination at S46 is NO. Accordingly, the control section 23 sets the input set resolution "720p" as a processing resolution used by the image processing section 24 for conversion. Hence, when image data with a resolution of 480i is inputted from a DVD player 10, the image processing section 24 converts the image data from 480i to 720p and outputs the converted image data to a display apparatus 30. Note that when, as in (1), the input set resolution is set to "Auto", the processing resolution used by the image processing section 24 for conversion is determined to be 1080p but in this case image data can be outputted at a resolution of 720p.

As shown in the above (1) to (4), for the output terminal OUT1 whose output set resolution is set to "Source", the processing resolution used by the image processing section 24 for conversion can be changed according to the input set resolution of an assigned input terminal. Thus, even when the input terminal assigned to the output terminal OUT1 is changed to another, by setting the output set resolution to "Source", the resolution does not need to be changed by a user operation, enabling to simplify an operation.

((5) For a Combination of the Output Terminal OUT2 and any of the Input Terminals IN1 to IN4)

Since, as shown in FIG. 19, the output set resolution of the output terminal OUT2 is set to 480i, an input set resolution set for an input terminal with which the output terminal OUT2 makes a combination is ignored and the processing resolution used by the image processing section 24 for conversion is determined to be the output set resolution. Thus, in FIG. 21, the determination at S41 is NO, the determination at S42 is NO, and the determination at S43 is NO. Accordingly, the control section 23 sets the output set resolution "480i" as a processing resolution used by the image processing section 24 for conversion. Hence, when image data with a resolution of 720i is inputted from a DVD player 10, the image processing section 24 converts the image data from 720i to 480i and outputs the converted image data to a display apparatus 30. As such, when a display apparatus 30 connected to the output terminal OUT2 supports only a specific resolution of 480i, by setting the output set resolution of the output terminal OUT2 to 480i, image data with a specific resolution of 480i can be always outputted to the display apparatus 30.

((6) For a Combination of the Output Terminal OUT3 and any of the Input Terminals IN1 to IN4)

Since, as shown in FIG. 19, the output set resolution of the output terminal OUT3 is set to "Auto", an input set resolution set for an input terminal with which the output terminal OUT3 makes a combination is ignored and the processing resolution used by the image processing section 24 for conversion is determined to be the output set resolution. Thus, in FIG. 21, the determination at S41 is NO and the determination at S42 is YES. Accordingly, the control section 23 obtains EDID of a display apparatus 30, reads resolutions supportable by the display apparatus 30 from the EDID, and determines one of the resolutions that is supportable by the AV amplifier 20 to be a resolution at which image data is outputted from the image processing section 24. For example, when the display apparatus 30 can support 480i, 480p, 720i, 720p, 1080i, and 1080p and the AV amplifier 20 can support 480i, 480p, 720i, 720p, 1080i, and 1080p, the resolution at which image data is outputted from the image processing section 24 is determined to be 1080p. Thus, when image data with a resolution of 480i is inputted from a DVD player 10, the image processing section 24 converts the image data from 480i to 1080p and outputs the converted image data to the display apparatus 30.

((7) For a Combination of the Output Terminal OUT4 and any of the Input Terminals IN1 to IN4)

Since, as shown in FIG. 19, the output set resolution of the output terminal OUT4 is set to "Through", an input set resolution set for an input terminal with which the output terminal OUT4 makes a combination is ignored and the processing resolution used by the image processing section 24 for conversion is determined to be the output set resolution. Thus, in FIG. 21, the determination at S41 is NO, the determination at S42 is NO, and the determination at S43 is YES. Accordingly, the control section 23 controls the image processing section 24 to output image data outputted from a DVD player 10 without performing resolution conversion on the image data. For example, when the DVD player 10 outputs image data with a resolution of 720p, the image processing section 24 outputs the image data at a resolution of 720p as it is to a display apparatus 30.

As described above, in the present example, an output set resolution and an input set resolution can be set and when the output set resolution is set to "Source", the input set resolution is set as a resolution at which image data is outputted from the image processing section 24. Thus, in the case of a display apparatus that can support all resolutions, the resolution at which image data is outputted from the image processing section 24 can be automatically changed according to the change in an input terminal assigned to an output terminal. On the other hand, when the output set resolution is set to other than "Source", the output set resolution is set as a resolution at which image data is outputted from the image processing section 24. Thus, when a display apparatus supports only a specific resolution, by setting the specific resolution as an output set resolution, image data can be always outputted at the specific resolution to the display apparatus.

Figure 22:
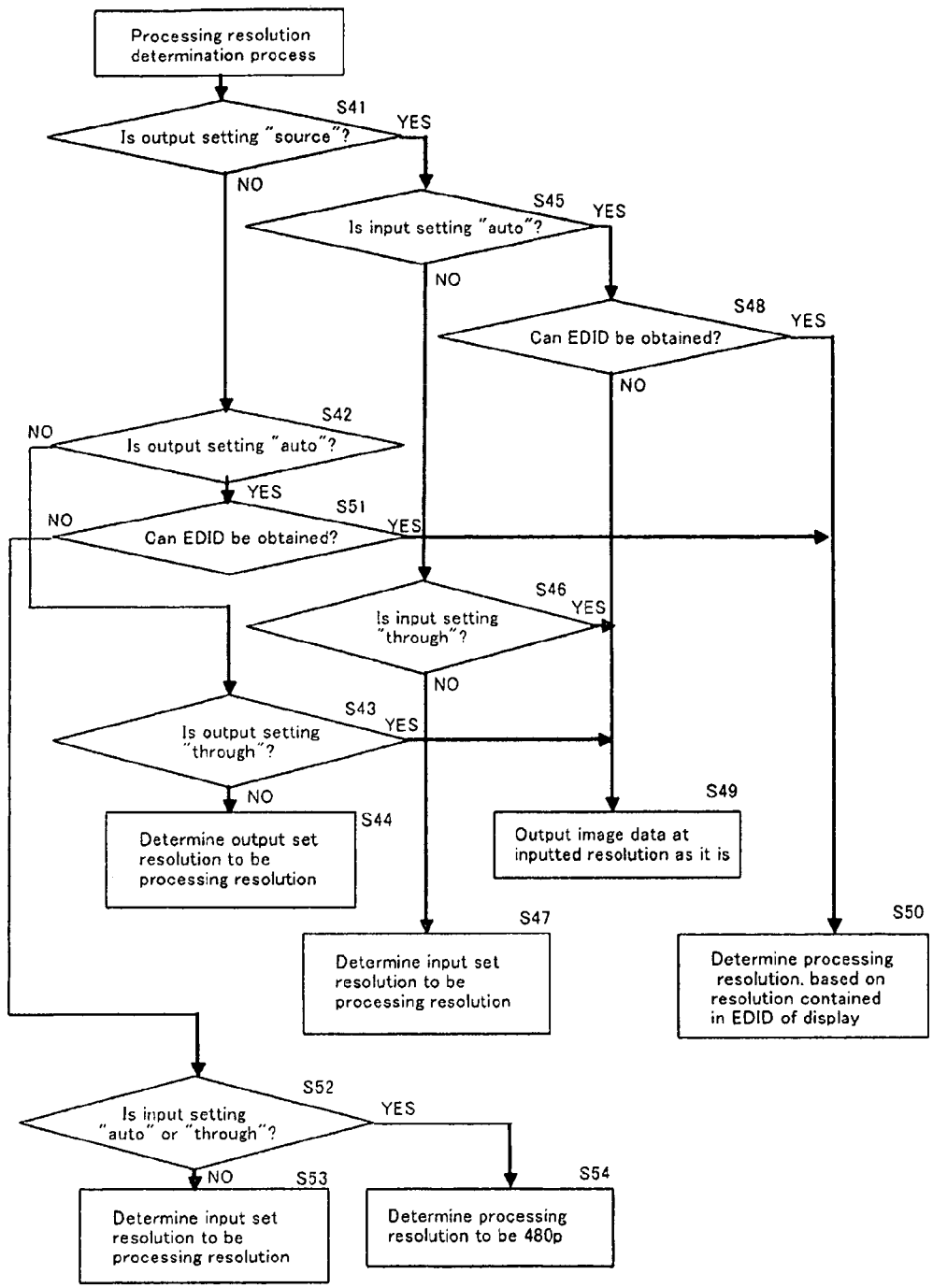
FIG. 22 is a flowchart showing a variant of FIG. 21.

Next, a variant of the process in FIG. 21 will be described with reference to a flowchart in FIG. 22. FIG. 22 is different from FIG. 21 in that processing steps S51 to S54 are added. At S42, if the output set resolution is set to "Auto" (YES at S42), then the control section 23 determines whether the control section 23 can obtain EDID containing resolution information from a display apparatus 30 connected to an output terminal (S51). This determination is the same as that at S48. If EDID containing resolution information can be obtained (YES at S51), then processing proceeds to S50.

On the other hand, if EDID containing resolution information cannot be obtained (NO at S51), then the control section 23 determines whether the input set resolution is set to "Auto" or "Through" (S52). If the input set resolution is not "Auto" or "Through", then the control section 23 determines the input set resolution to be a processing resolution (S53). Thus, a problem that a processing resolution cannot be determined can be solved. On the other hand, if the input set resolution is set to "Auto" (YES at S52), then since a processing resolution cannot be determined because resolution information cannot be obtained from the display apparatus 30, the control section 23 determines the processing resolution to be 480p which is considered to be able to be securely supported by the display apparatus 30 (S54). Similarly, when the input set resolution is set to "Through", too (YES at S52), the control section 23 determines the processing resolution to be 480p which is considered to be able to be securely supported by the display apparatus 30 (S54).

The preferred embodiments of the present invention are described above but the present invention is not limited thereto. An image transmitting apparatus is not limited to a DVD player and may be a BD recorder, a set-top box, a game machine, or the like. Also, an image receiving apparatus may be a projector or the like. A program for causing a computer to perform the above-described operation of an AV amplifier and a recording medium that records the program may be provided. Also, a program for only part of the above-described operation of an AV amplifier may be provided to an AV amplifier in the form of a firmware update. Furthermore, an electronic component, such as a CPU or microcomputer, that stores a program for only part of the above-described operation of an AV amplifier may be provided.

What is claimed is:

1. An image processing apparatus comprising:
a plurality of input terminals to which a plurality of image transmitting apparatuses that transmit image data can be connected;
a plurality of output terminals to which a plurality of image receiving apparatuses that receive image data can be connected;
an input setting section that sets an input image quality adjustment value for each of the plurality of input terminals, according to a user operation, wherein the input quality adjustment value for each of the plurality of input terminals is stored in a memory of the image processing apparatus;
an output setting section that sets an output image quality adjustment value for each of the plurality of output terminals, according to a user operation, wherein the output quality adjustment value for each of the plurality of output terminals is stored in the memory of the image processing apparatus;
a selecting section that selects one of the input terminals to which image data is to be inputted and one of the output terminals from which the image data is to be outputted according to a user operation, and responsive to the same user operation selects the input quality adjustment value and the output quality adjustment value from the memory for the selected input and output terminals, respectively;
an image quality adjustment value calculating section that adds together the selected input image quality adjustment value set for the selected input terminal and the selected output image quality adjustment value set for the selected output terminal and thereby calculates a processing image quality adjustment value;
an image processing section that adjusts image data inputted from the selected input terminals which is selected by the selection section according to the processing image quality adjustment value and outputs the adjusted image data from the selected output terminal which is selected by the selecting section.

2. The image processing apparatus according to claim 1, further comprising:
an input section that inputs an input value for each of the input terminals, according to a user operation, the input value being a changed value of an input image quality adjustment value;
a setting section that adds the input value to the input image quality adjustment value and sets a resulting value as a new input image quality adjustment value, when an instruction to apply the input value is inputted according to a user operation; and
an output terminal setting section that associates one output terminal from which image data is to be outputted with a corresponding input terminal, upon setting the input image quality adjustment value, wherein
when an instruction to apply the input value to an output terminal is inputted according to a user operation, the setting section adds the input value to an output image quality adjustment value of the output terminal that is associated with the input terminal by the output terminal setting section, and sets a resulting value as a new output image quality adjustment value.

3. The image processing apparatus according to claim 1, further comprising:
- an input section that inputs an input value for each of the input terminals, according to a user operation, the input value being a changed value of an input image quality adjustment value;
- a setting section that adds the input value to the input image quality adjustment value and sets a resulting value as a new input image quality adjustment value, when an instruction to apply the input value is inputted according to a user operation; and
- an output terminal setting section that associates one output terminal from which image data is to be outputted with a corresponding input terminal, upon setting the input image quality adjustment value, wherein
- when an instruction to apply input values of all input terminals to an output terminal is inputted according to a user operation, the setting section determines a common input value, based on input values of input terminals that are associated with a common output terminal by the output terminal setting section, adds the common input value to an output image quality adjustment value of the output terminal, and sets a resulting value as a new output image quality adjustment value.

4. The image processing apparatus according to claim 3, wherein the setting section determines a minimum input value among the input values of the input terminals that are associated with the common output terminal by the output terminal setting section, to be the common input value or determines an average value of the input values to be the common input value.

5. A non-transitory computer readable storage medium having stored thereon an image processing program for an image processing apparatus including a plurality of input terminals to which a plurality of image transmitting apparatuses that transmit image data can be connected and; a plurality of output terminals to which a plurality of image receiving apparatuses that receive image data can be connected; the image processing program causing a computer to perform the steps of:

- setting an input image quality adjustment value for each of the plurality of input terminals, according to a user operation; wherein the input image quality adjustment value for each of the plurality of input terminals is stored in a memory of the image processing apparatus;
- setting an output image quality adjustment value for each of the plurality of output terminals, according to a user operation; wherein the output image quality adjustment value for each of the plurality of output terminals is stored in the memory of the image processing apparatus;
- selecting one of the input terminals to which image data is to be inputted and one of the output terminals from which the image data is to be outputted according to a user operation, and responsive to the same user operation selects the input image quality adjustment value and one of image quality adjustment value from the memory for the selected input and output terminals, respectively;
- adding together the selected input image quality adjustment value set for the selected input terminal and the selected output image quality adjustment value set for the selected output terminal and thereby calculating a processing image quality adjustment value;
- adjusting image data inputted from the selected input terminals according to the processing image quality adjustment value and outputting the adjusted image data from the selected output terminal.

6. The image processing apparatus according to claim 1, wherein, when the input quality adjustment value or the output quality adjustment value is selected from the memory, a memory flag associated with the selection is set to 1, otherwise the memory flag is set to 0.

7. An image processing apparatus according to claim 6, wherein the image quality adjustment value calculating section calculates the processing image quality adjustment value only if the memory flag associated with the selection is set to 1.

* * * * *